United States Patent
Abuelsaad et al.

(10) Patent No.: US 9,534,917 B2
(45) Date of Patent: *Jan. 3, 2017

(54) UNMANNED AERIAL VEHICLE NAVIGATION ASSISTANCE

(71) Applicant: International Business Machines Corporation, Armonk, NY (US)

(72) Inventors: Kelly Abuelsaad, Somers, NY (US); Gregory J. Boss, Saginaw, MI (US); Kevin C. McConnell, Austin, TX (US); Shane B. McElligott, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/793,269

(22) Filed: Jul. 7, 2015

(65) Prior Publication Data

US 2016/0054143 A1 Feb. 25, 2016

Related U.S. Application Data

(63) Continuation of application No. 14/464,826, filed on Aug. 21, 2014, now Pat. No. 9,170,117.

(51) Int. Cl.
*G01C 21/00* (2006.01)
*B64C 27/00* (2006.01)
(Continued)

(52) U.S. Cl.
CPC ......... *G01C 21/3661* (2013.01); *B64C 39/024* (2013.01); *G01C 21/34* (2013.01);
(Continued)

(58) Field of Classification Search
CPC ......... G05D 1/00; G05D 1/0011; G01C 21/00; G01C 21/34; B64C 39/024; B64C 2201/12; B64C 2201/141; B64C 2201/024

See application file for complete search history.

(56) References Cited

U.S. PATENT DOCUMENTS 8,930,044 B1 * 1/2015 Peeters .................. B64C 19/00
701/2
9,158,304 B2 * 10/2015 Fleck ................... G05D 1/0011
(Continued)

FOREIGN PATENT DOCUMENTS

| WO | 2007146538 A2 | 12/2007 |
|---|---|---|
| WO | 2013030834 A1 | 3/2013 |
| WO | 2013123944 A1 | 8/2013 |

OTHER PUBLICATIONS

U.S. Appl. No. 14/464,826, filed Aug. 21, 2014.
List of IBM Patents or Patent Applications Treated as Related (Appendix P), filed herewith.

*Primary Examiner* — Michael J Zanelli
(74) *Attorney, Agent, or Firm* — Maeve Carpenter (57) ABSTRACT

In an approach to providing navigation assistance, one or more computer processors receive a request for navigation assistance to a destination from a first user. The one or more computer processors dispatch a navigation assistance UAV to the first user. The one or more computer processors determine a route for the first user to follow to the destination. The one or more computer processors provide navigation assistance for the route to the first user using the navigation assistance UAV.

20 Claims, 4 Drawing Sheets

(51) Int. Cl.
*G01C 21/36* (2006.01)
*G01C 21/34* (2006.01)
*G05D 1/00* (2006.01)
*B64C 39/02* (2006.01)

(52) U.S. Cl.
CPC ....... *G01C 21/365* (2013.01); *G01C 21/3688* (2013.01); *G05D 1/0011* (2013.01); *B64C 2201/024* (2013.01); *B64C 2201/027* (2013.01); *B64C 2201/12* (2013.01); *B64C 2201/141* (2013.01)

(56) References Cited

U.S. PATENT DOCUMENTS

| | | | |
|---|---|---|---|
| 2010/0087980 A1 | 4/2010 | Spura | |
| 2014/0022051 A1* | 1/2014 | Levien | A61M 5/20 340/5.2 |
| 2015/0120094 A1* | 4/2015 | Kimchi | B64C 39/024 701/3 |
| 2015/0134143 A1* | 5/2015 | Willenborg | G05D 1/0094 701/2 |

* cited by examiner

UNMANNED AERIAL VEHICLE NAVIGATION ASSISTANCE

BACKGROUND OF THE INVENTION

The present invention relates generally to the field of unmanned aerial vehicles, and more particularly to navigation assistance using unmanned aerial vehicles.

Many wireless communication computer controlled display devices are enabled to subscribe to a global positioning system (GPS) to generate and display on the devices defined area maps for the areas within which the GPS has located the display device position. Global positioning is a well-known and developed technology that uses groups of three satellites that receive signals from the moving unit being positioned and use this signal data to triangulate and, thus, position the moving unit. Such GPS mapping systems are installed on a large share of mobile wireless display devices. From such maps, the mobile user, either walking or riding in a motor vehicle, may get routing information.

An unmanned aerial vehicle (UAV), commonly known as a drone, is an aircraft without a human pilot aboard. Flight of the UAV is controlled either autonomously by onboard computers or by the remote control of a pilot on the ground or in another vehicle. The typical launch and recovery method of an unmanned aircraft is by the function of an automatic system or an external operator on the ground.

SUMMARY

Embodiments of the present invention disclose a method, a computer program product, and a system for providing navigation assistance. The method for providing navigation assistance may include one or more computer processors receiving a request for navigation assistance to a destination from a first user. The one or more computer processors dispatch a navigation assistance UAV to the first user. The one or more computer processors determine a route for the first user to follow to the destination. The one or more computer processors provide navigation assistance for the route to the first user using the navigation assistance UAV.

DETAILED DESCRIPTION

Route guidance and navigation is a growing industry. Many smart phones are capable of route navigation using mobile application software ("apps") that utilize GPS satellites. Typically, route navigation apps require a user to either listen to audible directions announced by the route navigation system, or to glance on to a screen that displays directions. If a user has hearing issues, listening to audible directions may be difficult. If a user is driving a vehicle while receiving navigation directions, glancing at a screen requires the user to momentarily look away from the road.

Embodiments of the present invention recognize that route guidance systems may be augmented with the use of an unmanned aerial vehicle (UAV) that operates as a visual guide to a driver or a pedestrian. A user with hearing issues can follow a UAV without having to listen to directions. A driver following a UAV may be less distracted than when having to glance at a screen within the vehicle. Embodiments of the present invention also recognize that UAV guidance may be viable where GPS signals are not, for example in tunnels or in a metropolitan area densely populated with large buildings. Implementation of embodiments of the invention may take a variety of forms, and exemplary implementation details are discussed subsequently with reference to the Figures.

Figure 1:
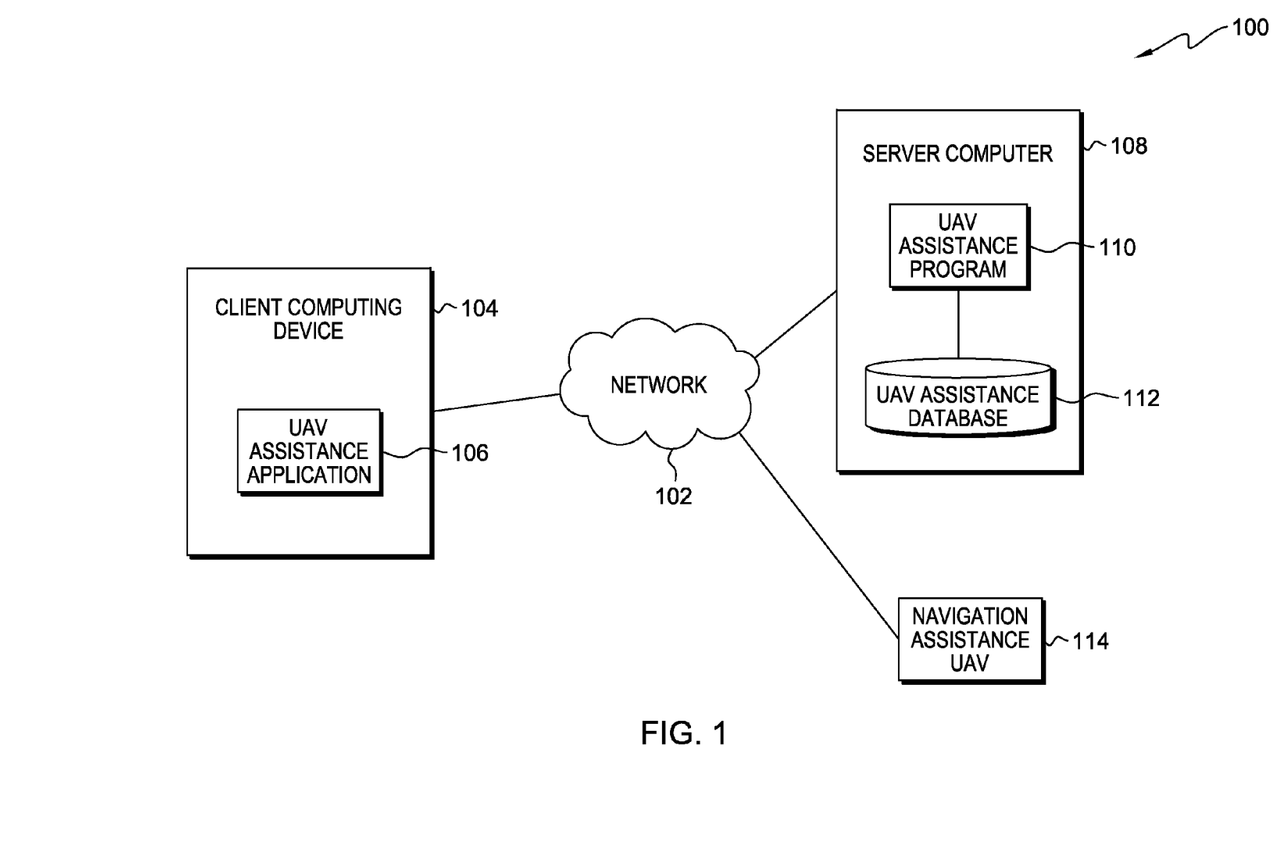
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104, server computer 108, and navigation assistance UAV 114 interconnected over network 102. Network 102 can be, for example, a telecommunications network, a local area network (LAN), a wide area network (WAN), such as the Internet, or a combination of the three, and can include wired, wireless, or fiber optic connections. Network 102 may include one or more wired and/or wireless networks that are capable of receiving and transmitting data, voice, and/or video signals, including multimedia signals that include voice, data, and video information.

Client computing device 104 may be a laptop computer, a tablet computer, a specialized computer server, a smart phone, or any programmable mobile electronic device capable of communicating with server computer 108 and navigation assistance UAV 114 via network 102 and with various components and devices within distributed data processing environment 100. Client computing device 104 may be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. Client computing device 104 may be integrated into a user's vehicle. In general, client computing device 104 represents any programmable electronic device or combination of programmable electronic devices capable of executing machine readable program instructions and communicating with other computing devices via a network, such as network 102. Client computing device 104 includes UAV assistance application 106.

UAV assistance application 106 is mobile application software that provides an interface between a user of client computing device 104 and both server computer 108 and navigation assistance UAV 114. Mobile application software, or an "app", is a computer program designed to run on smartphones, tablet computers and other mobile devices. UAV assistance application 106 enables a user of client computing device 104 to request and receive navigation assistance from server computer 108 and navigation assistance UAV 114.

Server computer 108 may be a management server, a web server, or any other electronic device or computing system capable of receiving and sending data. In other embodiments, server computer 108 may represent a server computing system utilizing multiple computers as a server system, such as in a cloud computing environment. In another embodiment, server computer 108 may be a laptop computer, a tablet computer, a netbook computer, a personal computer (PC), a desktop computer, a personal digital assistant (PDA), a smart phone, or any programmable electronic device capable of communicating with client computing device 104 and navigation assistance UAV 114 via network 102. In another embodiment, server computer 108 represents a computing system utilizing clustered computers and components to act as a single pool of seamless resources. Server computer 108 includes UAV assistance program 110 and UAV assistance database 112.

UAV assistance program 110 provides navigation and routing guidance to a user of UAV assistance application 106 by dispatching a navigation assistance UAV to the location of the user upon request. UAV assistance program 110 directs the navigation assistance UAV on a route to the user's requested destination such that the user can visually follow the navigation assistance UAV to the requested destination rather than listening to audible directions or having to view directions or a map on a screen. The user of UAV assistance program 110 may be a pedestrian, a bicyclist, a driver or rider in a vehicle, or any user of UAV assistance application 106 requiring navigation assistance and guidance. In one embodiment, UAV assistance program 110 resides on server computer 108. In another embodiment, UAV assistance program 110 may reside on navigation assistance UAV 114. UAV assistance program 110 is depicted and described in further detail with respect to FIG. 2 and FIG. 3.

UAV assistance database 112 resides on server computer 108. In another embodiment, UAV assistance database 112 may reside on client computing device 104, on navigation assistance UAV 114, or elsewhere in the environment. A database is an organized collection of data. UAV assistance database 112 can be implemented with any type of storage device capable of storing data that may be accessed and utilized by server computer 108, such as a database server, a hard disk drive, or a flash memory. In other embodiments, UAV assistance database 112 can represent multiple storage devices within server computer 108. UAV assistance database 112 stores maps and route information used by UAV assistance program 110. UAV assistance database 112 also stores a registry and a unique identifier for client computing device 104 and other client computing devices (not shown) in distributed data processing environment 100.

Navigation assistance UAV 114 is a UAV that receives direction from UAV assistance program 110 in order to provide visual navigation assistance to a user of UAV assistance application 106. Navigation assistance UAV 114 physically guides a user along a route to the user's destination. Navigation assistance UAV 114 may include a display, such as an LED panel, for displaying identification as well as directional instructions, such as directional arrows, distance to the next waypoint, speed, street names, etc. Navigation assistance UAV 114 may also include a laser for pointing to objects and locations, such as vehicles, street signs, and preferred highway lanes. In one embodiment, navigation assistance UAV 114 appears visually striking, for example, with unique painted patterns, so that a user can distinguish navigation assistance UAV 114 from other navigation assistance UAVs in the same area. In one embodiment, navigation assistance UAV 114 is one of many navigation assistance UAVs that may constitute a fleet of navigation assistance UAVs in distributed data processing environment 100 (not shown).

Figure 2:
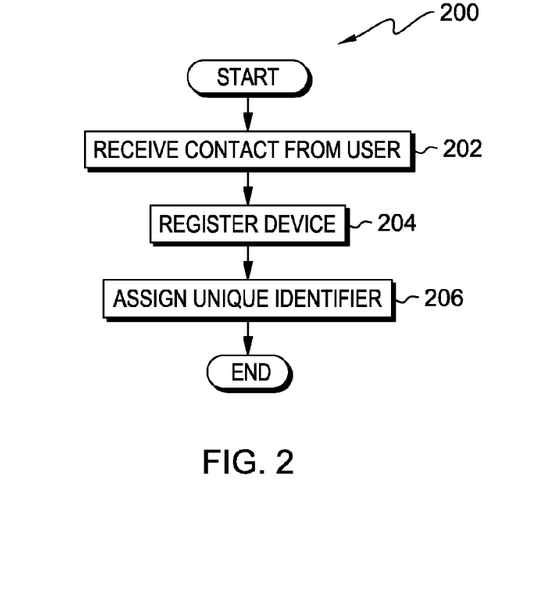
FIG. 2 is a flowchart depicting operational steps of a UAV assistance program, on a server computer within the distributed data processing environment of FIG. 1, for initialization of navigation assistance, in accordance with an embodiment of the present invention.

FIG. 2 is flowchart 200 depicting operational steps of UAV assistance program 110, on server computer 108 within distributed data processing environment 100 of FIG. 1, for initialization of navigation assistance, in accordance with an embodiment of the present invention.

UAV assistance program 110 receives contact from a user (step 202). A user downloads and launches UAV assistance application 106 and makes contact with UAV assistance program 110. In one embodiment, the user purchases a subscription to UAV assistance program 110 for a period of time or for a specified number of uses. In another embodiment, the user may purchase a onetime use contract in order to try UAV assistance program 110 before committing to a long-term subscription.

UAV assistance program 110 registers the user's device (step 204). UAV assistance program 110 registers the user's device, such as client computing device 104, as UAV assistance enabled, and stores the registry in UAV assistance database 112. A user may register more than one device. For example, if client computing device 104 is integrated into the user's vehicle, the user may register the vehicle as well as a smartphone so that the user can utilize UAV assistance program 110 while driving or while walking. In addition to registering the user's device, UAV assistance program 110 may query the user for preferences. For example, UAV assistance program 110 may query the user for a preferred distance and height to be maintained between navigation assistance UAV 114 and client computing device 104 while navigation assistance UAV 114 provides navigation guidance. In another example, UAV assistance program 110 may query the user regarding preferred navigation routes, such as shortest duration, shortest distance, or least number of turns.

UAV assistance program 110 assigns a unique identifier (step 206). UAV assistance program 110 assigns a unique identifier to client computing device 104 and stores the identifier in UAV assistance database 112. Assigning a unique identifier to client computing device 104 allows UAV assistance program 110 to locate and distinguish client computing device 104 from other client computing devices in distributed data processing environment 100. The unique identifier also allows UAV assistance program 110 to locate other client computing devices that may be heading to the same destination as client computing device 104.

Figure 3:
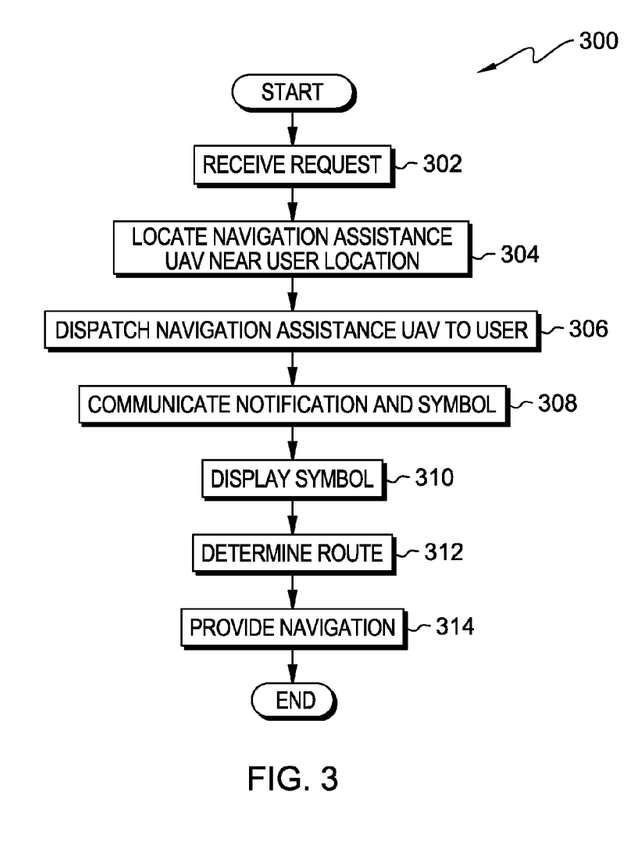
FIG. 3 is a flowchart depicting operational steps of a UAV assistance program, on a server computer within the distributed data processing environment of FIG. 1, for navigation assistance.

FIG. 3 is flowchart 300 depicting operational steps of UAV assistance program 110, on server computer 108 within distributed data processing environment 100 of FIG. 1, for navigation assistance.

UAV assistance program 110 receives a request (step 302). UAV assistance program 110 receives a request from a user of UAV assistance application 106 for navigation guidance to a destination. The request includes the unique identifier that UAV assistance program 110 assigned to client computing device 104 and stored in UAV assistance database 112 during the initialization process. UAV assistance program 110 also determines the location of client computing device 104 upon receiving the request. In one embodiment, UAV assistance program 110 determines the location of client computing device 104 by locating an embedded GPS device in client computing device 104 or by using other known triangulation or location tracking technologies. In another embodiment, UAV assistance program 110 may determine the location of client computing device 104 by querying the user to input a location via UAV assistance application 106. In a further embodiment, a user may request a location, via UAV assistance application 106, from which UAV assistance program 110 may begin. For example, a user may request that UAV assistance program 110 begin once the user arrives at an entrance to a highway. In another example, a user may request that UAV assistance program 110 begin at the location of a second registered device, such that a parent may request navigation assistance, via UAV assistance application 106 on a smart phone, for a child in a different location that is driving a vehicle with UAV assistance application 106 on an integrated client computing device.

UAV assistance program 110 locates a navigation assistance UAV near the user's location (step 304). In one embodiment, UAV assistance program 110 searches a fleet of navigation assistance UAVs and determines the navigation assistance UAV, such as navigation assistance UAV 114, that is close to client computing device 104, is available for navigation guidance, and has sufficient energy to complete the requested trip. In another embodiment, UAV assistance program 110 may locate two or more navigation assistance UAVs which, in sequence, can complete the trip, taking into account the amount of energy, or fuel, each navigation assistance UAV has and any restrictions on roaming areas for a given navigation assistance UAV. UAV assistance program 110 may determine the proximity of a navigation assistance UAV based on a distance threshold or radius. The distance threshold may depend on the user's location. For example, if a user is in a populated area such as a city, the distance threshold may be short, such as two blocks, versus if the user is in an unpopulated area where the threshold distance may be longer, such as two miles.

UAV assistance program 110 dispatches a navigation assistance UAV to the user (step 306). UAV assistance program 110 dispatches navigation assistance UAV 114 to the location of client computing device 104. UAV assistance program 110 communicates the location coordinates of client computing device 104 to navigation assistance UAV 114 that UAV assistance program 110 determined in step 302. Navigation assistance UAV 114 travels to a location where navigation assistance UAV 114 is visible to the user.

UAV assistance program 110 communicates a notification and a symbol to the user of UAV assistance application 106 (step 308). UAV assistance program 110 notifies the user via UAV assistance application 106 on client computing device 104 that navigation assistance UAV 114 is nearby. UAV assistance program 110 also communicates a symbol via UAV assistance application 106 on client computing device 104 which identifies navigation assistance UAV 114 as the navigation assistance UAV that is providing navigation assistance. The user may acknowledge the communication from UAV assistance program 110 via UAV assistance application 106. For example, if client computing device 104 is a smart phone, the user may acknowledge the communication from UAV assistance program 110 by pressing a button displayed on the screen of the smart phone.

UAV assistance program 110 displays the symbol (step 310). UAV assistance program 110 directs navigation assistance UAV 114 to display the previously communicated symbol to the user. If other navigation assistance UAVs are in the vicinity, the user of UAV assistance application 106 can locate navigation assistance UAV 114 by matching the symbol displayed by UAV assistance application 106 to the symbol displayed by navigation assistance UAV 114. In one embodiment, UAV assistance program 110 displays the symbol on an LED display panel on navigation assistance UAV 114. In another embodiment, UAV assistance program 110 displays the symbol by using an embedded laser in navigation assistance UAV 114 to project the symbol on a vehicle or object visible to the user. In one embodiment, UAV assistance program 110 receives acknowledgement or other confirmation from the user, via UAV assistance application 106, that navigation assistance UAV 114 is visible.

UAV assistance program 110 determines a route (step 312). Based on the requested destination, the user's location, and any previously provided user preferences, UAV assistance program 110 retrieves maps and route information from UAV assistance database 112 and determines the route that navigation assistance UAV 114 follows to lead the user to the requested destination. In one embodiment, UAV assistance program 110 determines the route using known GPS technology.

UAV assistance program 110 provides navigation (step 314). UAV assistance program 110 directs navigation assistance UAV 114 to travel ahead of and lead the user of UAV assistance application 106 to the requested destination. In one embodiment, UAV assistance program 110 provides navigation by directing navigation assistance UAV 114 to physically lead the user to the requested destination by flying in front of the user or the user's vehicle. UAV assistance program 110 directs navigation assistance UAV 114 to maintain optimal visual sight by evaluating the distance above the horizon with respect to the location of client computing device 104. For example, if the user is driving a vehicle, UAV assistance program 110 may ensure navigation assistance UAV 114 is not so high that the user cannot see it due to obstructions in the vehicle. Also, UAV assistance program 110 may ensure navigation assistance UAV 114 is not so high that the user has to lean forward and look up to see navigation assistance UAV 114. In addition, UAV assistance program 110 may ensure navigation assistance UAV 114 is high enough above common obstacles, for example, vehicles and traffic lights, but low enough for the user to see navigation assistance UAV 114 naturally. In an embodiment, navigation assistance UAV 114 includes a sensor with which UAV assistance program 110 can interact to determine the relative location of navigation assistance UAV 114 to client computing device 104 in order to maintain optimal visual sight. In one embodiment, navigation assistance UAV 114 informs the user on to which streets to turn by actually turning and flying down the streets. In another embodiment, navigation assistance UAV 114 may also indicate preparatory actions. For example, navigation assistance UAV 114 may indicate to the user to change lanes by flying overhead in the lane in which the user needs to be. In another embodiment, navigation assistance UAV 114 may indicate preparatory actions by displaying a directional arrow or words on the LED display panel.

In one embodiment, UAV assistance program 110 provides navigation by directing navigation assistance UAV 114 to project a laser image on a moving target in front of the user. For example, there may be instances when navigation assistance UAV 114 cannot maintain a visual lead for the user, such as when there are obstacles such as tunnels, street lights, power lines, overhead signs, bridges, etc. If navigation assistance UAV 114 cannot maintain a visual lead, then UAV assistance program 110 directs navigation assistance UAV 114 to project a laser image, such as a red X, on an object in front of the user. For example, navigation assistance UAV 114 may project a laser image on the bumper or other non-disruptive surface of a vehicle in front of the user, and the user can follow the laser image until navigation assistance UAV 114 comes back into view. UAV assistance program 110 may query other users of UAV assistance application 106 in vehicles in the vicinity of client computing device 104 for vehicles with destinations similar to that of the user. If UAV assistance program 110 determines that one or more users of UAV assistance application 106 have route segments that overlap the user's route and are near the user, UAV assistance program 110 directs navigation assistance UAV 114 to project a laser image on the bumper of a vehicle with the similar destination to act as a lead for the user. If the lead vehicle's route diverges from the user's route, UAV assistance program 110 directs navigation assistance UAV 114 to project a laser image on the bumper of another vehicle with the similar destination to act as a lead for the user. As an alternative, UAV assistance program 110 may direct navigation assistance UAV 114 to land on the lead vehicle and display directional messages on the LED panel for the user to follow. In another example, if the user's vehicle travels under a bridge, and the connection to the sky is disrupted, UAV assistance program 110 may direct navigation assistance UAV 114 to project words with the laser to indicate to the user that the visual connection will be lost for a number of seconds. Navigation assistance UAV 114 may display "Continue for 30 seconds . . . ", "Continue for 29 seconds . . . ", etc., at which point the laser may disappear for 29 seconds until the user's vehicle emerges from the bridge.

In another embodiment, UAV assistance program 110 provides navigation by directing navigation assistance UAV 114 to project a laser image on a stationary target that is visible to the user. For example, if there are no additional vehicles on the road on which the user is traveling, UAV assistance program 110 may direct navigation assistance UAV 114 to project a laser image onto the road in front of the user or onto a street sign, indicating a turn onto the targeted street is imminent. In another example, if the user is a pedestrian, UAV assistance program 110 may direct navigation assistance UAV 114 to project a laser image onto a solid color wall or fence or onto the sidewalk.

In yet another embodiment, if the user loses visual contact with navigation assistance UAV 114, UAV assistance program 110 may provide navigation by transmitting audible messages to client computing device 104 via UAV assistance application 106. If preferred, the user can continue to follow the audible guidance, or return to following the physical guidance once navigation assistance UAV 114 is in view.

In a further embodiment, UAV assistance program 110 may provide navigation by coordinating a lead vehicle for the user of UAV assistance application 106 instead of dispatching navigation assistance UAV 114. In the embodiment, UAV assistance program 110 determines which, if any, other vehicles in the vicinity of client computing device 104 are traveling to similar destinations via communicating with other client computing devices in vehicles that are using UAV assistance application 106. UAV assistance program 110 coordinates communication between a lead vehicle and the trailing vehicle containing client computing device 104 by directing the lead vehicle to display a symbol or image for the trailing vehicle to follow. For example, the lead vehicle may have a light integrated into the rear of the vehicle for the purpose of providing navigation guidance. If the lead vehicle completes the common route segment before the trailing vehicle arrives at the requested destination, UAV assistance program 110 determines and communicates with a second lead vehicle to continue the guidance for the trailing vehicle. UAV assistance program 110 continues this process until the user of client computing device 104 has arrived at the requested destination.

In an embodiment where UAV assistance program 110 may provide navigation by coordinating a lead vehicle for the user of UAV assistance application 106 instead of dispatching navigation assistance UAV 114, UAV assistance program 110 may interact with the rear view camera of the lead vehicle, such that the UAV assistance program 110 can monitor the trailing vehicle through the lead vehicle's rear view camera. For example, via the lead vehicle's rear view camera, UAV assistance program 110 can determine the space between the lead vehicle and the trailing vehicle. If the separation between the two vehicles exceeds a pre-defined value, then UAV assistance program 110 can alert the driver of the lead vehicle to slow down, via a message on the client computing device in the lead vehicle using UAV assistance application 106. In addition, through the lead vehicle's rear view camera, UAV assistance program 110 may note information about the trailing vehicle. For example, UAV assistance program 110 may detect the license plate of the trailing vehicle and compare it to license plates on a security list. The security list may reside on UAV assistance database 112 or UAV assistance program 110 may access the security list via network 102 from another computing device in distributed data processing environment 100 (not shown). If the license plate of the trailing vehicle is on a security list, UAV assistance program 110 may contact the appropriate authorities directly, or UAV assistance program 110 may alert the user to take action.

Figure 4:
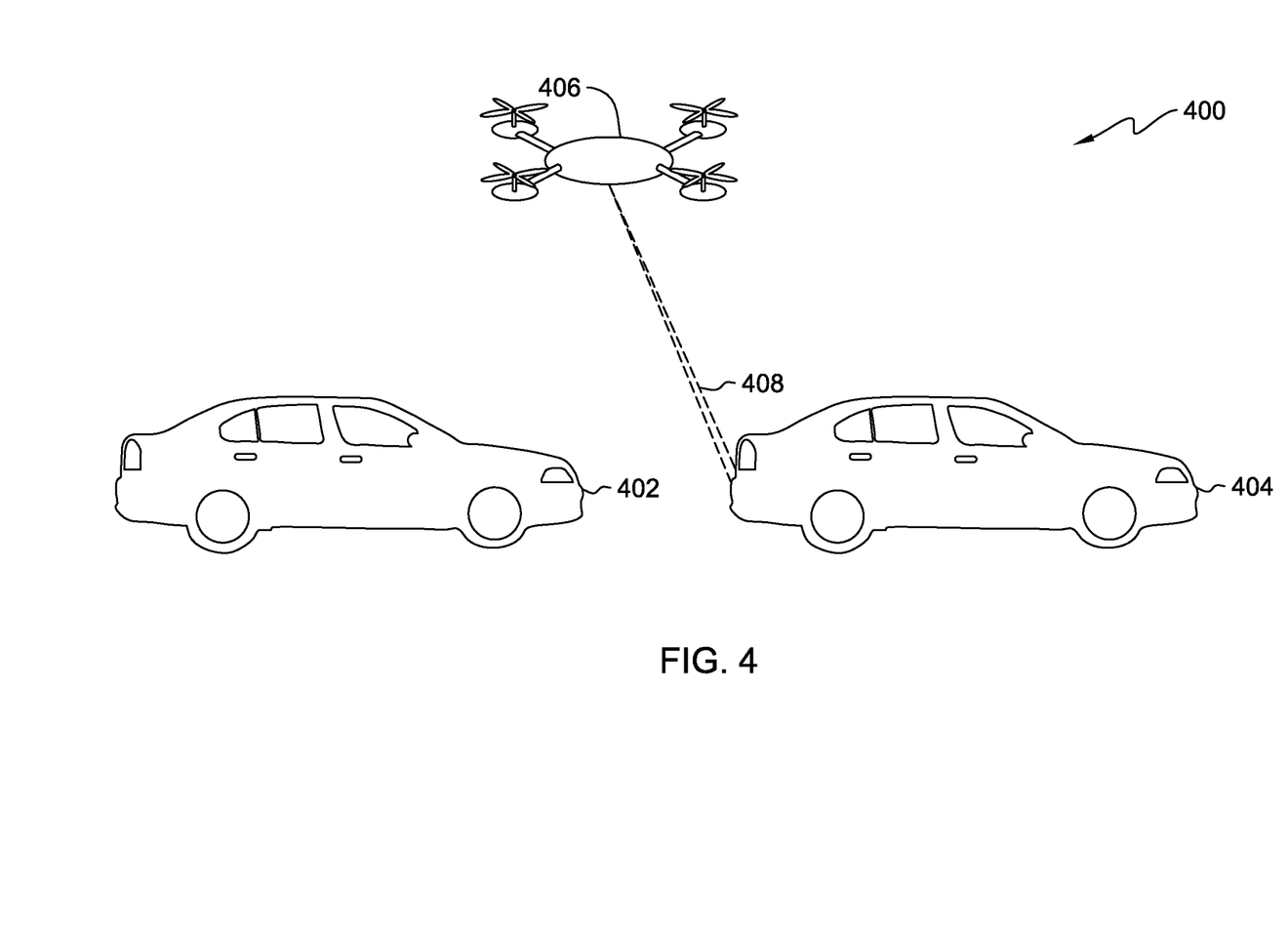
FIG. 4 illustrates an example of an operating environment of the UAV assistance program, operating on a server computer within the distributed data processing environment of FIG. 1, in accordance with an embodiment of the present invention.

FIG. 4 illustrates diagram 400 depicting an example of an operating environment of UAV assistance program 110, operating on server computer 108 within distributed data processing environment 100 of FIG. 1, in accordance with an embodiment of the present invention.

In diagram 400, client computing device 104 resides in car 402 and navigation assistance UAV 114 is represented by navigation assistance UAV 406. The user of client computing device 104 requests navigation assistance via UAV assistance application 106. In response to the request, UAV assistance program 110 dispatches navigation assistance UAV 406 to the user's location, per step 306 of FIG. 3. UAV assistance program 110 provides navigation, per step 314 of FIG. 3, by directing navigation assistance UAV 406 to lead the user, i.e. the driver of car 402, toward the requested destination. When UAV assistance program 110 determines that navigation assistance UAV 406 may need to fly out of the user's view to avoid an obstacle, UAV assistance program 110 determines that car 404 is traveling to a similar destination. UAV assistance program 110 directs navigation assistance UAV 406 to project an image on the bumper of car 404 using laser 408. The driver of car 402 follows the image projected on car 404 until navigation assistance UAV 406 comes back into view.

Figure 5:
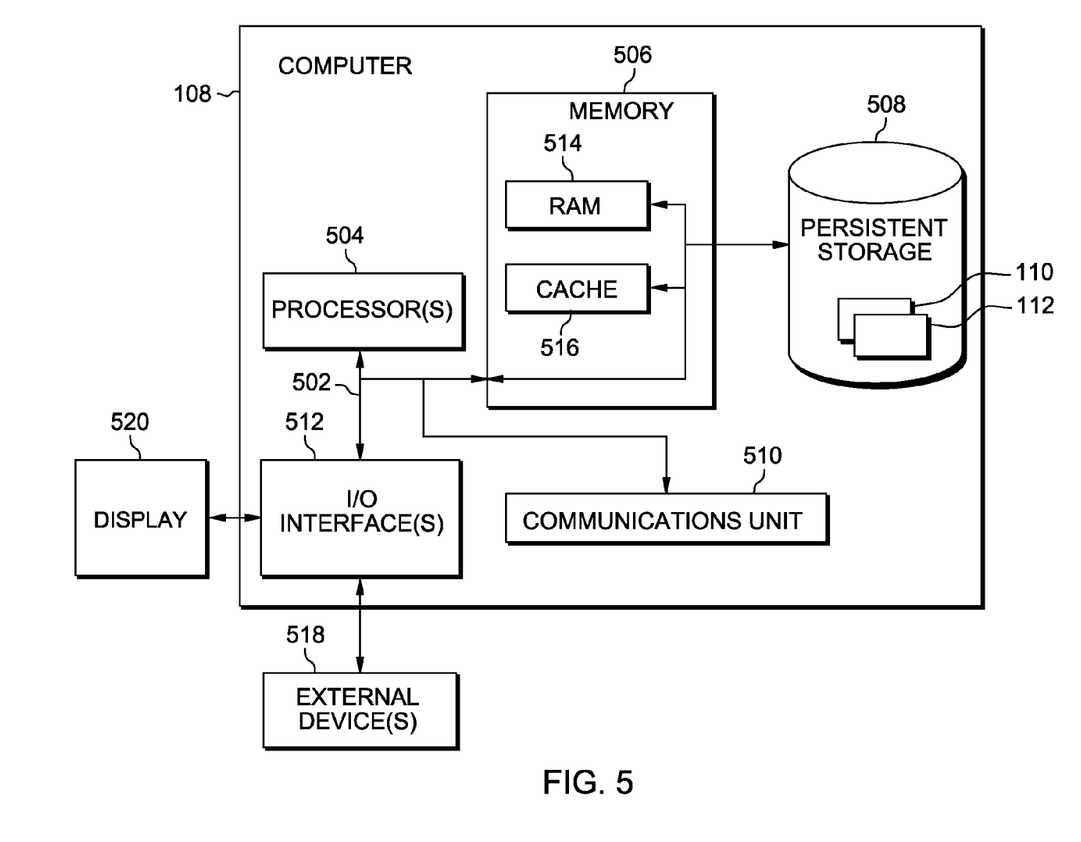
FIG. 5 depicts a block diagram of components of the server computer executing the UAV assistance program, in accordance with an embodiment of the present invention.

FIG. 5 depicts a block diagram of components of server computer 108 executing UAV assistance program 110, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Server computer 108 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

UAV assistance program 110 and UAV assistance database 112 are stored in persistent storage 508 for execution and/or access by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of client computing device 104. In these examples, communications unit 510 includes one or more network interface cards. Communications unit 510 may provide communications through the use of either or both physical and wireless communications links. UAV assistance program 110 and UAV assistance database 112 may be downloaded to persistent storage 508 through communications unit 510.

I/O interface(s) 512 allows for input and output of data with other devices that may be connected to server computer 108. For example, I/O interface(s) 512 may provide a connection to external device(s) 518 such as a keyboard, a keypad, a touch screen, a microphone, a digital camera, and/or some other suitable input device. External device(s) 518 can also include portable computer readable storage media such as, for example, thumb drives, portable optical or magnetic disks, and memory cards. Software and data used to practice embodiments of the present invention, e.g., UAV assistance program 110 and UAV assistance database 112, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing navigation assistance, the method comprising:
   receiving, by one or more computer processors, a request for navigation assistance to a destination from a first user;
   dispatching, by the one or more computer processors, a navigation assistance UAV to the first user;
   determining, by the one or more computer processors, a route for the first user to follow to the destination; and
   providing, by the one more computer processors, navigation assistance for the route to the first user using the navigation assistance UAV.

2. The method of claim 1, further comprising, notifying, by the one or more computer processors, the first user of the navigation assistance UAV associated with the request for navigation assistance.

3. The method of claim 2, wherein notifying the first user of the navigation assistance UAV associated with the request for navigation assistance further comprises:
   sending, by the one or more computer processors, a first symbol associated with the navigation assistance UAV to the first user; and
   displaying, by the one or more computer processors, the first symbol on the navigation assistance UAV.

4. The method of claim 1, wherein providing navigation assistance to the first user further comprises:
   directing, by the one or more computer processors, the navigation assistance UAV to arrive in a position in view of the first user at the location of the first user; and
   directing, by the one or more computer processors, the navigation assistance UAV to travel ahead of the first user for the first user to follow to the destination.

5. The method of claim 4, wherein directing the navigation assistance UAV to travel ahead of the first user to the destination further comprises displaying, by the one or more computer processors, instructions on a display associated with the navigation assistance UAV.

6. The method of claim 1, wherein providing navigation assistance to the first user further comprises:
   directing, by the one or more computer processors, the navigation assistance UAV to arrive in a position out of view of the first user at the location of the first user; and
   directing, by the one or more computer processors, the navigation assistance UAV to project an image on an object in view of the first user at the location of the first user for the first user to follow to the destination.

7. The method of claim 1, further comprising, responsive to receiving a request for navigation assistance to a destination from a first user, determining, by the one or more computer processors, the location of the first user.

8. The method of claim 1, further comprising, responsive to receiving a request for navigation assistance, locating, by the one or more computer processors, a navigation assistance UAV near a location of the first user.

9. The method of claim 1, further comprising:
   determining, by the one or more computer processors, whether at least one other user is traveling to the destination of the first user; and responsive to determining at least one other user is traveling to the destination of the first user, directing, by the one or more computer processors, the at least one other user to display an image in view of the first user for the first user to follow to the destination.

10. The method of claim 9, further comprising utilizing, by the one or more computer processors, a rear view camera of the at least one other user to monitor the first user.

11. The method of claim 1, wherein receiving a request for navigation assistance to a destination from a first user further comprises:
   receiving, by the one or more computer processors, contact from the first user;
   registering, by the one or more computer processors, one or more computing devices associated with the first user; and
   assigning, by the one or more computer processors, one or more unique identifiers to the one or more computing devices associated with the first user.

12. A computer program product for providing navigation assistance, the computer program product comprising:
   one or more computer readable storage media and program instructions stored on the one or more computer readable storage media, the program instructions comprising:
   program instructions to receive a request for navigation assistance to a destination from a first user;
   program instructions to dispatch a navigation assistance UAV to the first user;
   program instructions to determine a route for the first user to follow to the destination; and
   program instructions to provide navigation assistance for the route to the first user using the navigation assistance UAV.

13. The computer program product of claim 12, wherein program instructions to notify the first user of the navigation assistance UAV associated with the request for navigation assistance further comprises:
   program instructions to send a first symbol associated with the navigation assistance UAV to the first user; and
   program instructions to display the first symbol on the navigation assistance UAV.

14. The computer program product of claim 12, wherein program instructions to provide navigation assistance to the first user further comprises:
   program instructions to direct the navigation assistance UAV to arrive in a position in view of the first user at the location of the first user; and
   program instructions to direct the navigation assistance UAV to travel ahead of the first user for the first user to follow to the destination.

15. The computer program product of claim 12, wherein program instructions to provide navigation assistance to the first user further comprises:
   program instructions to direct the navigation assistance UAV to arrive in a position out of view of the first user at the location of the first user; and
   program instructions to direct the navigation assistance UAV to project an image on an object in view of the first user at the location of the first user for the first user to follow to the destination.

16. The computer program product of claim 12, further comprising:
   program instructions to determine whether at least one other user is traveling to the destination of the first user; and
   responsive to determining at least one other user is traveling to the destination of the first user, program instructions to direct the at least one other user to display an image in view of the first user for the first user to follow to the destination.

17. A computer system for providing navigation assistance, the computer system comprising:
   one or more computer processors;
   one or more computer readable storage media;
   program instructions stored on the computer readable storage media for execution by at least one of the one or more processors, the program instructions comprising:
   program instructions to receive a request for navigation assistance to a destination from a first user;
   program instructions to dispatch a navigation assistance UAV to the first user;
   program instructions to determine a route for the first user to follow to the destination; and
   program instructions to provide navigation assistance for the route to the first user using the navigation assistance UAV.

18. The computer system of claim 17, wherein program instructions to notify the first user of the navigation assistance UAV associated with the request for navigation assistance further comprises:
   program instructions to send a first symbol associated with the navigation assistance UAV to the first user; and
   program instructions to display the first symbol on the navigation assistance UAV.

19. The computer system of claim 17, wherein program instructions to provide navigation assistance to the first user further comprises:
   program instructions to direct the navigation assistance UAV to arrive in a position in view of the first user at the location of the first user; and
   program instructions to direct the navigation assistance UAV to travel ahead of the first user for the first user to follow to the destination.

20. The computer system of claim 17, wherein program instructions to provide navigation assistance to the first user further comprises:
   program instructions to direct the navigation assistance UAV to arrive in a position out of view of the first user at the location of the first user; and
   program instructions to direct the navigation assistance UAV to project an image on an object in view of the first user at the location of the first user for the first user to follow to the destination.

* * * * *